United States Patent [19]

John, Jr. et al.

[11] Patent Number: 4,863,555
[45] Date of Patent: Sep. 5, 1989

[54] TUBE FLUSH ETCHING, RINSING AND DRYING APPARATUS AND METHOD

[75] Inventors: Clarence D. John, Jr., Penn Hills Township, Allegheny County; Francis C. McNerney, Murrysville, both of Pa.

[73] Assignee: Westinghouse Electric Corp., Pittsburgh, Pa.

[21] Appl. No.: 78,487

[22] Filed: Jul. 27, 1987

[51] Int. Cl.$^4$ .......................... B08B 9/02; C23G 3/04
[52] U.S. Cl. ................................. 156/625; 156/651; 156/664; 134/22.11; 134/22.12; 134/96; 134/168 R; 15/306 B
[58] Field of Search .............. 134/22.11, 22.12, 22.13, 134/22., 14, 22.15, 96, 168 R, 168 C, 169 R, 169 C, 171; 15/302, 304, 306 B; 156/625, 642, 651, 664, 626

[56] References Cited

U.S. PATENT DOCUMENTS

| | | | |
|---|---|---|---|
| 2,674,760 | 4/1954 | Finch | 15/304 |
| 3,051,061 | 8/1962 | Baxter et al. | 428/213 |
| 3,156,248 | 11/1964 | Rand | 134/60 |
| 3,173,318 | 3/1965 | Lindemann | 82/47 |
| 3,447,074 | 5/1969 | Sower et al. | 324/261 |
| 3,743,124 | 7/1973 | Jarvis | 177/210 R |
| 3,765,050 | 10/1973 | Van Allman et al. | 15/304 |
| 4,333,773 | 6/1982 | Fjallstrom | 134/22.12 |
| 4,392,506 | 7/1983 | Tanaka et al. | 134/46 |
| 4,422,210 | 12/1983 | Bergsand et al. | 134/168 C X |
| 4,423,622 | 1/1984 | Bartlett | 15/304 X |
| 4,522,276 | 6/1985 | Fogg et al. | 177/145 |

FOREIGN PATENT DOCUMENTS

| | | | |
|---|---|---|---|
| 93090 | 2/1922 | Switzerland | 134/169 R |
| 962013 | 6/1964 | United Kingdom | 134/169 C |
| 969801 | 9/1964 | United Kingdom | 134/22.12 |

*Primary Examiner*—David L. Lacey
*Assistant Examiner*—Andrew J. Anderson

[57] ABSTRACT

An apparatus for processing the interiors of elongated hollow tubes having open opposite ends, such as by acid etching, water rinsing, steam cleaning or air drying the tube interiors, includes a pair of tube clamping mechanism being operable between tube clamping and unclamping conditions. The clamping mechanisms when in their clamping conditions support the tubes in stationary side-by-side spaced positions for processing and at locations on the tubes displaced inwardly from their opposite ends. The apparatus also has a pair of fluid supply manifolds each being displacable between disengaged and engaged positions with respect to the open opposite tube ends and having nozzles for engaging the respective tube ends to seal off the interior of the tube from the external atmosphere when the manifolds are in their engaged positions. A selector valve is mounted in each manifold and is selectively operable to provide communication between at least one source of pressurized processing fluid and the tube interior through the respective manifold. A pair of pneumatic actuator mechanisms are used for displacing the manifolds between their disengaged and engaged positions. The apparatus also has a frame and the clamping mechanisms, manifolds and actuator mechanisms are mounted thereon for movement toward and away from one another to place them at different distances from one another corresponding to the different lengths of the tube being processed.

17 Claims, 7 Drawing Sheets

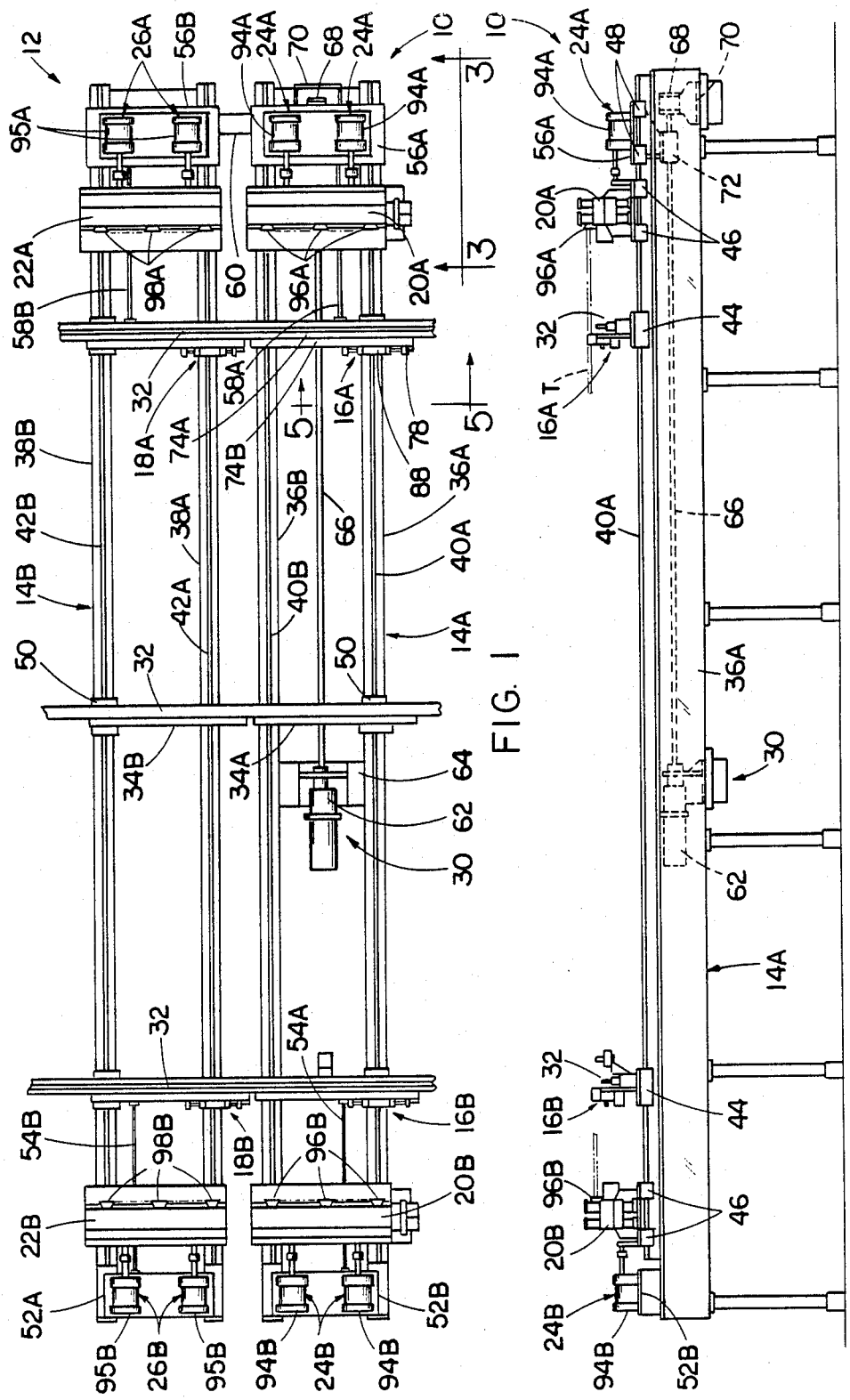

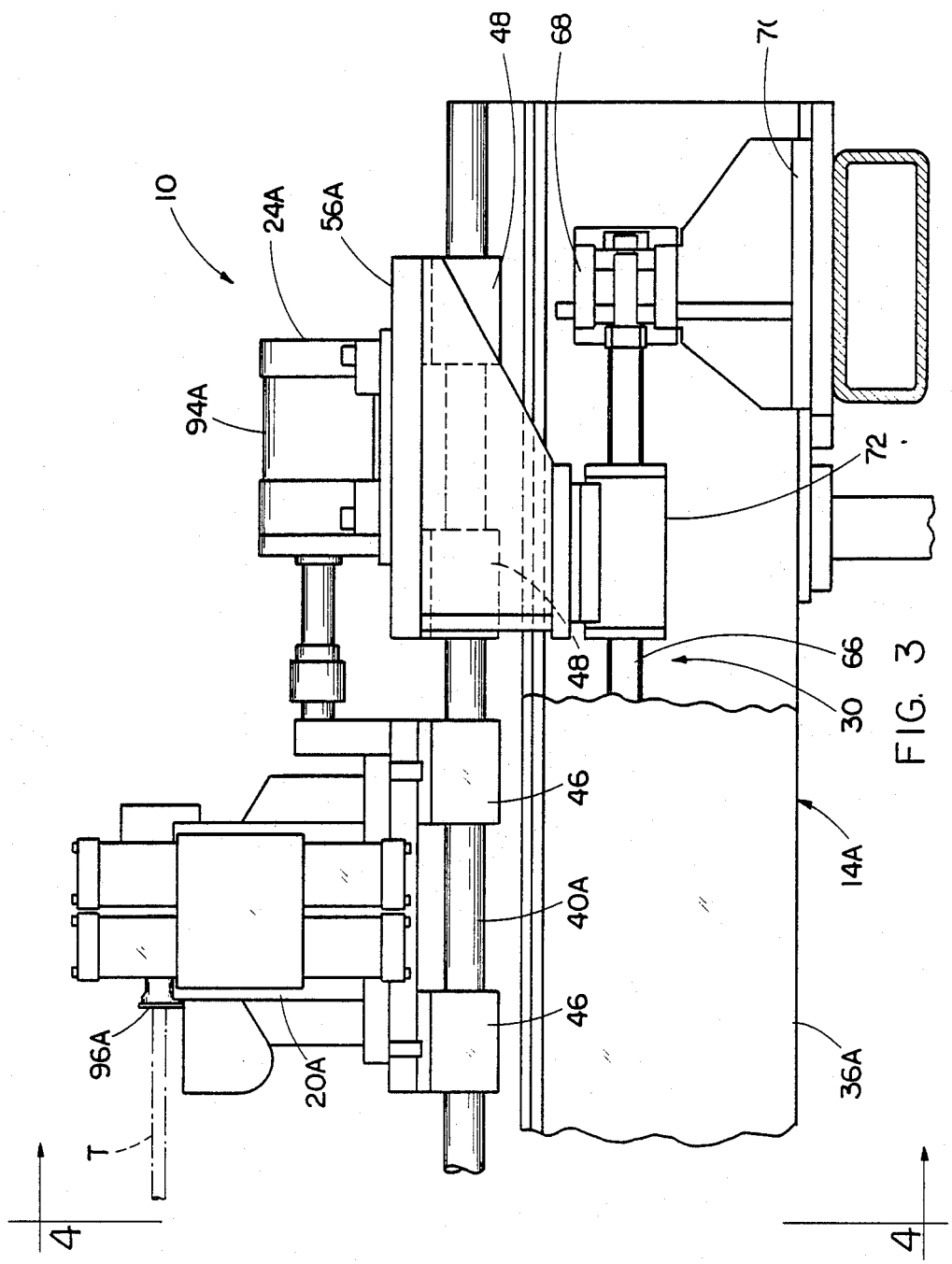

TUBE FLUSH ETCHING, RINSING AND DRYING APPARATUS AND METHOD

CROSS REFERENCE TO RELATED APPLICATION

Reference is hereby made to the following copending application dealing with related subject matter and assigned to the assignee of the present invention: "Tube Flush Etching, Rinsing, Drying, Inspecting Ad Plugging Subsystem And Method In A Tube Manufacturing System" by Clarance D. John, Jr., et al, assigned U.S. Ser. No. and filed Aug. 3, 1987.

BACKGROUND OF THE INVENTION

1. Field of the Invention

The present invention relates generally to nuclear fuel rod tube manufacture and, more particularly, is concerned with an apparatus and method for flush etching, rinsing and drying tubes in the tube manufacturing system.

2. Description of the Prior Art

Because of their critical roles in nuclear reactors, tubes used in fuel rods must meet very stringent quality control standards. Therefore, after formation by multiple pilgering passes, the tubes are subjected to a variety of processing steps which include etching, rinsing and drying thereof.

In one prior art approach, tube etching, rinsing and drying were carried out on a batch basis meaning that the tubes in lot size bundles, usually six hundred tubes to a bundle (or, in some instances, a half lot size bundle of three hundred tubes) were successively etched, rinsed and dried. More particularly, the bundle of tubes are loaded into a carrier and transported by a crane to an etching station where it is dipped into an open-top etching tank. Since the opposite ends of the tubes are open, both the inside and outside diameter surfaces of the tubes are etched. To determine whether sufficient material has been removed from the tube surfaces by the etching, the entire bundle of tubes must be withdrawn from the etching tank one or more times, inspected by an operator and then returned to the tank after each withdrawal if more etching is required. Each withdrawal of the bundle from the etching tank exposes the tubes to atmospheric oxygen.

After completion of tube etching, rinsing of the tubes is carried out in a similar manner. The crane transfers the carrier loaded with etched tubes to a rinsing station. There, the bundle of tubes and carrier are lowered into a water tank and the etched tubes rinsed to neutralize the acid bath. The rinsed bundle of tubes is then removed from the water tank and next hosed down while suspended over a drain. The carrier loaded with the rinsed bundle of tubes is then transferred to a drying station where it is lowered into a forced air chamber. The chamber is closed and a blower and heaters are turned on to force hot air over the bundle to dry the same.

In recent times, to improve manufacturing productivity and quality much emphasis has been placed on automation of fuel rod tube manufacture. However, certain aspects of the steps in the above-described prior art approach have tended to constrain such improvements. One aspect is the large number of tubes in each bundle. In processing such a great quantity of tubes concurrently through etching, rinsing and drying, it is cumbersome and time-consuming to have to transport the bundle from one station to the next, and it is difficult to precisely control the quality of individual tubes without substantial manual handling and tube rework being required. Another aspect is etching of the tubes in the presence of atmospheric oxygen. This step has created the problem of fluoride deposits which makes it necessary to introduce extra steps just to rectify this problem.

In another prior art approach intended to reduce some of the above-mentioned problems, tubes are flush etched by pumping etching acid only through the inside of the tubes individually. A problem with this approach, however, is the difficulty in achieving effective and uniform etching of the tube. For effective and uniform etching, the acid flow and the residence time of the acid in the tube is critical. Ideally, the acid should uniformly contact each portion of the tube inside for the same amount of time and with the same concentration of acid. In actuality, the interaction with the tube metal acts to dilute the acid which then causes a slightly tapered inside diameter surface along the length of the tube. This is caused because the acid is most effective (highest in concentration) at the beginning of a tube, removing the most metal there, and less effective (lowest in concentration) at the end of the tube, removing the least metal there.

One proposed solution to this problem of achieving effective and uniform tube etching is to introduce acid flow through the tube from one end thereof for a specified time and then turn the tube around and introduce flow through the tube from the opposite end. Not only is this proposed solution inefficient, but the residual acid has to be rinse flushed from the tube interior between acid flushes. A further disadvantage of this proposed solution is that it allowed exposure of the acid to the atmosphere, causing fume control problems, acid splash prevention concerns and formation of fluoride deposits in the tubes.

Consequently, a need has evolved for a different approach to tube etching and rinsing in fuel rod tube manufacture which promises improved etching effectiveness and uniformity and thereby improved product quality and reliability.

SUMMARY OF THE INVENTION

The present invention provides an apparatus and method for flush etching and rinsing and also drying tubes designed to satisfy the aforementioned needs. The apparatus utilizes two manifolds which cap opposite ends of a set or group of tubes, for instance fifteen in number. Respective supplies of etching acid and rinsing water are provided to the manifolds to use in flushing the tubes. A valving arrangement permits acid to be flushed through the tubes in one direction and then in the opposite direction, each may be followed by a water rinse flush. This technique removes material on the inside of the tube so as to provide a relatively uniform tube inside diameter and minimize the possibility of causing excessive tapering of the tube wall. Using this technique, the tube is etched and rinsed in a controlled manner which leaves its inside diameter more uniform and substantially featureless. The same apparatus can be used for steam cleaning and air drying the tube interiors following the etching and rinsing process.

Accordingly, the present invention is directed to an apparatus for processing the interiors of elongated hollow tubes having open opposite ends, such as by acid etching, water rinsing, steam cleaning or air drying the tube interiors. The tube processing apparatus comprises: (a) means for supporting at least one tube in a stationary position for processing and at locations on the tube displaced inwardly from its opposite ends; (b) tube end sealing means displacable between disengaged and engaged positions with respect to the open opposite tube ends, the sealing means being spaced from the tube ends when in its disengaged position and capping the tube ends to seal off the interior of tube from the external atmosphere when in is engaged position; (c) operable means for selectively establishing communication between at least one source of pressurized processing fluid and the tube interior through the tube end sealing means for processing the tube interior; and (d) power means for displacing the tube end sealing means between its disengaged and engaged positions.

More particularly, the supporting means includes a pair of tube clamping mechanisms being operable between tube clamping and unclamping conditions. The tube end sealing means includes a pair of fluid supply manifolds having nozzles for engaging the respective open opposite ends of the tube to seal off the interior of the tube from the external atmosphere when the manifolds are in their engaged positions. The operable means is a selector valve mounted in each of the manifolds. The power means includes a pair of pneumatic actuator mechanisms.

Still further, the processing apparatus has a frame and the clamping mechanisms, manifolds and actuator mechanisms are mounted thereon for movement toward and away from one another to place them at different distances from one another corresponding to the different lengths of the tubes being processed.

The present invention is also directed to a method of processing the interiors of elongated hollow tubes having open opposite ends, such as by acid etching, water rinsing, steam cleaning or air drying the tube interiors. The tube processing method comprises the steps of: (a) supporting at least one tube in a stationary position for processing; (b) engaging the respective open opposite ends of the tube to cap the same and seal off the interior of the tube from the external atmosphere; and (c) establishing communication between the interior of the tube and at least one source of pressurized fluid for processing the tube interior.

More particularly, the steps of reverse flow flush etching and rinsing are carried out by: first, flush etching through the tube interior in one direction with acid; second, flush rinsing through the tube interior in the same direction with water to purge the acid; third, flush etching through the tube interior in the opposite direction with the acid; and, fourth, flush rinsing through the tube interior in the same direction with water to purge the acid. Still further, the steps of steam cleaning and air drying are carried out by: first, flowing steam through the tube interior; and, second, flowing cool air through the tube interior.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a top plan view of the apparatus of the present invention being utilized at a tube flush etching and rinsing station and a tube cleaning and drying station arranged in tandem in a fuel rod tube manufacturing system.

FIG. 2 is an elevational view of the apparatus of FIG. 1.

FIG. 3 is an enlarged elevational view of one of the manifolds and actuator mechanisms of the apparatus as seen along line 3—3 of FIG. 1.

DETAILED DESCRIPTION OF THE INVENTION

Figure 4:
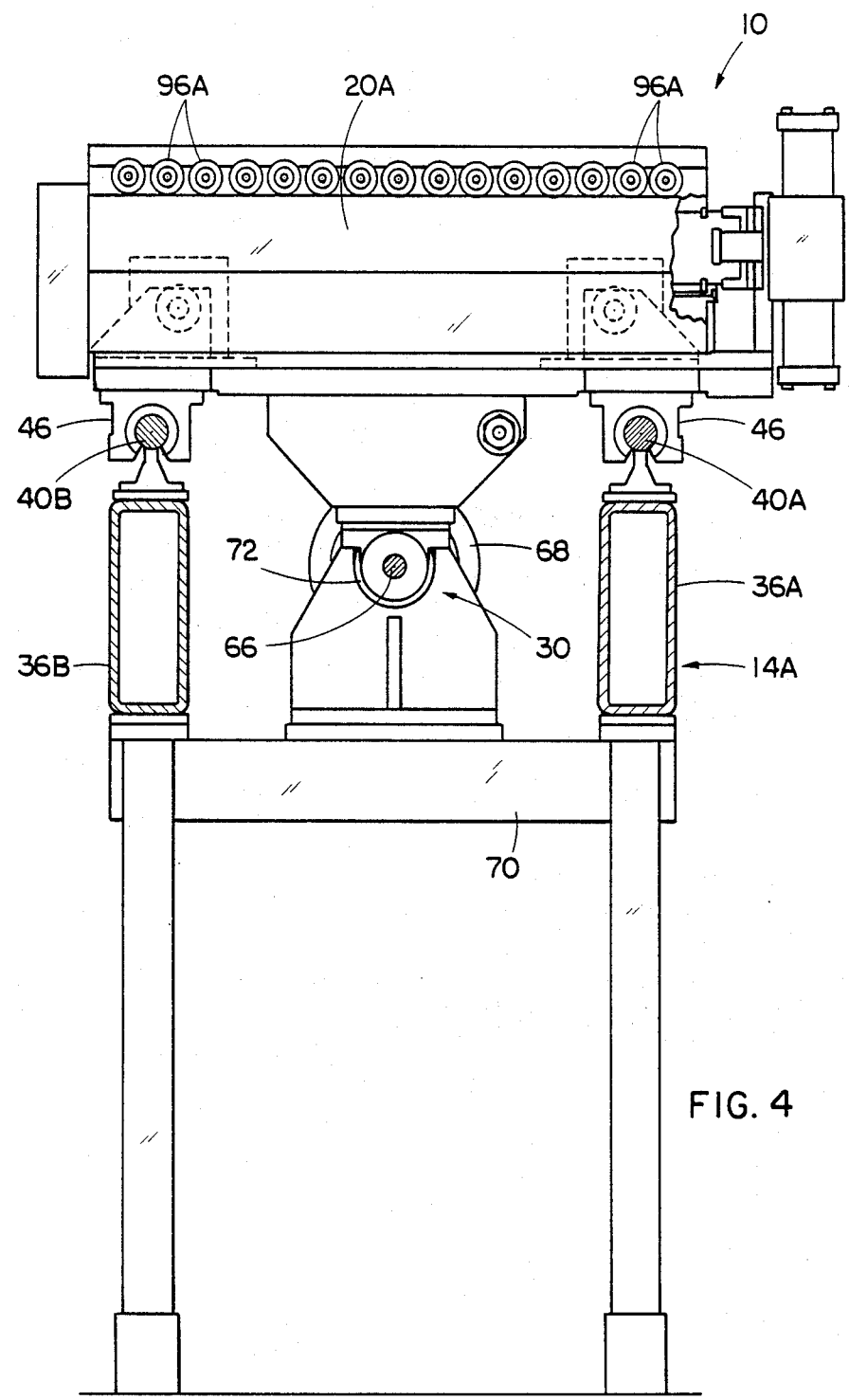
FIG. 4 is another elevational view, partly in section, of the one manifold of the apparatus as seen along line 4—4 of FIG. 3, also showing a portion of a drive mechanism of an optional apparatus for making adjustments thereto to accommodate processing of tubes of different lengths.

In the following description, like reference characters designate like or corresponding parts. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1 and 2, there is shown a portion of a nuclear fuel rod tube manufacturing system which includes a first, tube flush etching and rinsing station 10 arranged in a tandem relationship with a second, tube cleaning and drying station 12 (only seen in FIG. 1). At the first station 10, the tubes T (only one tube being partially seen in FIG. 2) are flush etched and rinsed in parallel flows of first acid and then rinse water through the tubes T. More particularly, alternating reverse flow etching and rinsing steps are executed. First, etching is carried out by flushing the interior of the tube in one direction with acid. Next, rinsing with water is carried out in the same direction to purge the acid. Then, by reversing the acid flow, etching is carried out by flushing acid in the opposite direction. Finally, rinsing with water is carried out through the tube interior in the same direction. After the reverse flow etching and rinsing steps are completed, the tubes T is moved to the second station 12, the cleaning and drying station. At the second station 12, the tubes are cleaned and dried. First, the tubes are cleaned by flowing steam through the tube interiors in either direction. Then, the tubes are dried by flowing air through the tube interiors.

The tube interior processing apparatus of the present invention is generally the same at both stations 10 and 12 and the basic mechanical maneuvers of the components of the apparatus are common to both stations. In their basic components, the tube interior processing apparatuses at the stations 10 and 12 include frames 14A and 14B, pairs of tube clamping mechanisms 16A,16B, and 18A,18B, pairs of fluid supply manifolds 20A,20B and 22A,22B, pairs of actuator mechanisms 24A,24B and 26A,26B, pairs of selector valves 28A,28B (only the selector valves at station 10 being seen in FIG. 6) and a drive mechanism 30 common to each. Also, spaced members 32 of a tube conveyor common to both stations 10 and 12 and a middle pair of tube supports 34A and 34B associated respectively with the stations are depicted in FIGS. 1 and 2. The middle supports 34A,34B support the tubes T at locations intermediate between their opposite ends.

More particularly, the frames 14A,14B repectively include pairs of spaced-apart floor-supported frame members 36A,36B and 38A,38B having pairs of cylindrical guide rails 40A,40B and 42A,42B fixedly supported upon their upper sides (only the frame members 36A,36B and the guide rails 40A,40B of station 10 being seen in FIG. 4). Each of the tube clamping mechanism 16A,16B and 18A,18B, the manifolds 20A,20B and 22A,22B, the actuating mechanisms 24A,24B and 26A,26B, and the conveyor members 32 associated with the clamping mechanisms and the middle tube supports 34A,34B have respective linear bearings 44-50 supporting them in longitudinally sliding relation on the respective guide rails 40A,40B,42A,42B.

Even though slidably mounted on the guide rails, the middle tube supports 34A,34B are maintained in a stationary central position therealong and the left tube clamping mechanisms 16B,18B and actuator mechanisms 24B,26B are maintained in stationary positions along the left end portions of the guide rails, as shown in FIGS. 1 and 2. The left clamping mechanisms 16B,18B are interconnected to respective bases 52B,52B of the left actuator mechanisms 24B,26B by tie rods 54A,54B. The left manifolds 20B,22B are only moved a few inches in right or left directions along the guide rails for engaging them with or disengaging them from the left ends of the tubes, as will be described later.

However, the drive mechanism 30 is provided for causing sliding movement of the right tube clamping mechanisms 16A,18A manifolds 20A,22A and actuator mechanisms 24A,26A along the guide rails 40A,40B,-42A,42B through longer distances when it becomes necessary to change the distances between the respective components to accommodate different lengths of tubes being processed. The right clamping mechanisms 16A,18A are interconnected to respective bases 56A,56B of the right actuator mechanisms 24A,26A by tie rods 58A,58B so that the right clamping mechanisms will slide with the right actuator mechanisms. The right manifolds 20A,22A are connected respectively to the right actuator mechanisms 24A,26A so the right manifolds will also slide with the right actuator mechanisms. The right actuator mechanisms 24A,26A are rigidly connected to one another by a bracket 60 interconnecting their bases 56A,56B so they will slide together on the guide rails.

Therefore, the drive mechanism 30 need only drive one of the right actuator mechanisms 24A,26A at one of the stations 10,12 to relocate all of the right clamping mechanisms 16A,18A, manifolds 20A,22A and actuator mechanisms 24A,26A as a unit along the guide rails 40A,40B,42A,42B. In the illustrated embodiment, the drive mechanism 30 includes a motor 62 mounted by a support plate 64 between the members 36A,36B of the frams 14A at station 10. An externally-threaded feed screw 66 is connected at one end to and rotatably driven by the motor 62 and extends therefrom to and is rotatably supported at its opposite end by a bushing 68 mounted by another support plate 70 between the frame members 36A,36B, as shown in FIGS. 1 and 3. Near the bushing 68, the feed screw 66 passes through a complementarily internally-threaded cylindrical member 72 attached to the lower side of the base 56A of the right actuator mechanisms 24A. Thus, as the feed screw 66 is rotated in opposite directions by the motor 62, it causes movement of the right ones of the clamping mechanisms, manifolds and actuator mechanisms toward and away from the left ones. In such manner, the distances between the right and left components can be adjusted to set up the apparatuses for processing different lengths of tubes, for instance, tubes varying from 72 to 180 inches in length.

Figure 5:
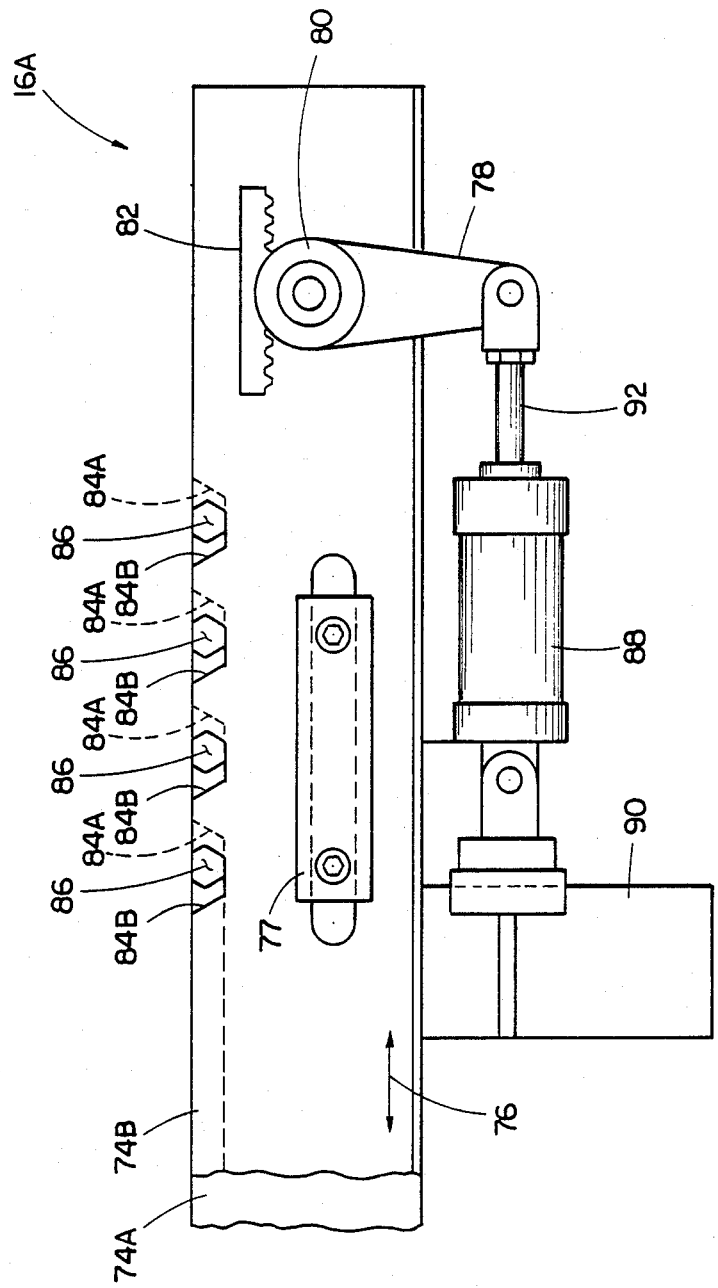
FIG. 5 is an enlarged elevational view, in fragmentary form of one of the clamping mechanisms of the apparatus as seen along line 5—5 of FIG. 1.

The pairs of tube clamping mechanism 16A,16B and 18A,18b at the stations 10 and 12 are operable for supporting pluralities of tubes in generally horizontally-extending side-by-side positions for processing at the respective stations. A representative one tube clamping mechanism 16A is shown in FIGS. 1 and 5. It includes a pair of linear members 74A,74B mounted in side-by-side relation. The one member 74A is stationarily mounted in fixed relation to the respective linear bearings 44 of the clamping mechanism 16A. The other member 74B is slidably mounted to the one stationary member 74A by a plate 77 for movement fore and aft in the direction of the double arrow 76 upon pivotal movement of a crank arm 78 rotatably journalled to the stationary member 74A. An upper hub 80 on the arm 78 has gear teeth (not shown) which mesh with gear teeth 82 on the slidable member 74B. Along the upper edge portions of each of the linear members 74A,74B are defined a series of notches 84A,84B which together form a series of tube clamping recesses 86 which increase or decrease in width as the slidable member 74B is moved toward the right or the left relative to the stationary member 74A.

The clamping mechanism 16A also includes an actuator 88 in the form of a pnuematic cylinder anchored at one end to a portion 90 of the frame 14A and coupled at its piston rod 92 to the outer end of the pivotal crank arm 78. Extension of the piston rod 92 rotates the arm 78 counterclockwise and moves the slidable member 74B toward the left, decreasing the width of the recesses 86 and causing the mechanism 16A to assume a tube clamping condition. On the other hand, retraction of the piston rod 92 rotates the arm 78 clockwise and moves the slidable member 74B toward the right, increasing the width of the recesses 86 and causing the mechanism 16A to assume an unclamping condition.

The pairs of fluid supply manifolds 20A,20B and 22A,22B are displacable between disengaged and engaged positions with respect to the open opposite ends of the tubes supported by the pairs of clamping mechanisms 16A,16B and 18A,18B. The pairs of actuator mechanisms 24A,24B and 26A,26B are operable to displace the manifolds between their disengaged and engaged positions. More particularly, the actuator mechanism 24A,24B and 26A,26B having respective pneumatic cylinders 94A,94B and 96A,96B mounted to their respective bases and coupled to the respective manifolds. Extension of the cylinders move the manifolds toward one another, whereas retraction of the cylinders move the manifolds away from one another.

Figure 6:
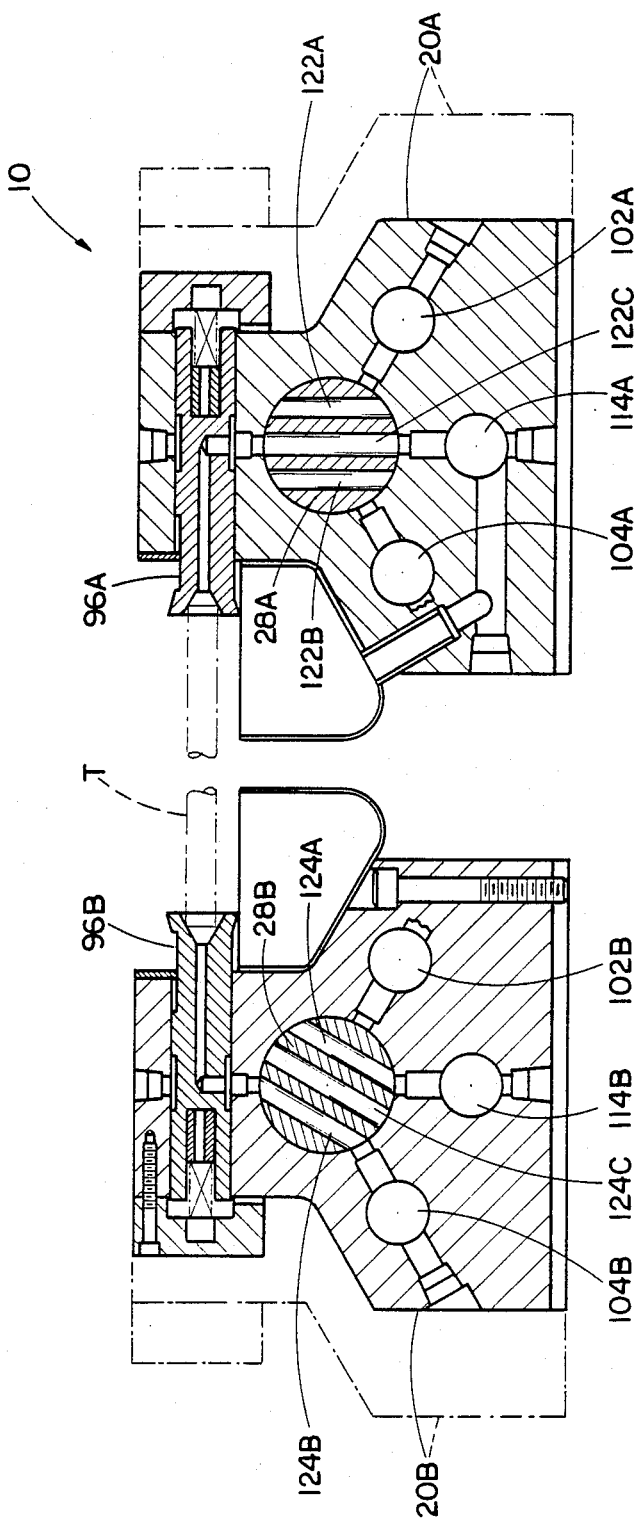
FIG. 6 is an enlarged fragmentary longitudinal sectional of the apparatus of FIG. 1, showing the manifolds at the tube flush etching and rinsing station with a tube in place.

The fluid supply manifolds 20A,20B and 22A,22B have respective pluralities of nozzles 96A,96B and 98A,98B along their lengths facing toward one another for engaging the respective open opposite ends of the tubes to cap and seal off the interior of the tubes from the external atmosphere when the manifolds are in the engaged positions. The nozzles 96A,96B of the manifolds 20A,20B are paired in opposing relation as are the nozzles 98A,98B of the manifolds 22A,22B. Although only a few nozzles from the respective pluralities thereof are shown in FIG. 1, the actual design has fifteen tube-receiving nozzles on each manifold. Further, although not shown in FIG. 1, the tubes would be located coincident with the centerlines of the paired nozzles (such as shown in FIG. 6). The nozzles are spring biased to closed conditions and require insertion of a tube end to open. Thus, if tubes are absent from any of the paired nozzle positions, those respective nozzles will not be opened when the manifolds are moved to their engaged positions.

In FIG. 6, there is shown a section through the right and left manifolds 20A,20B at the flush etching and rinsing station 10. The manifolds are shown in their engaged positions in solid line form and disengaged positions in phantom line form. The nozzles 96A,96B of the manifolds 20A,20B are spaced from the tube ends when in their disengaged positions and cap the tube ends to seal off the interior of the tube from the external atmosphere when in their engaged positions.

Figure 7:
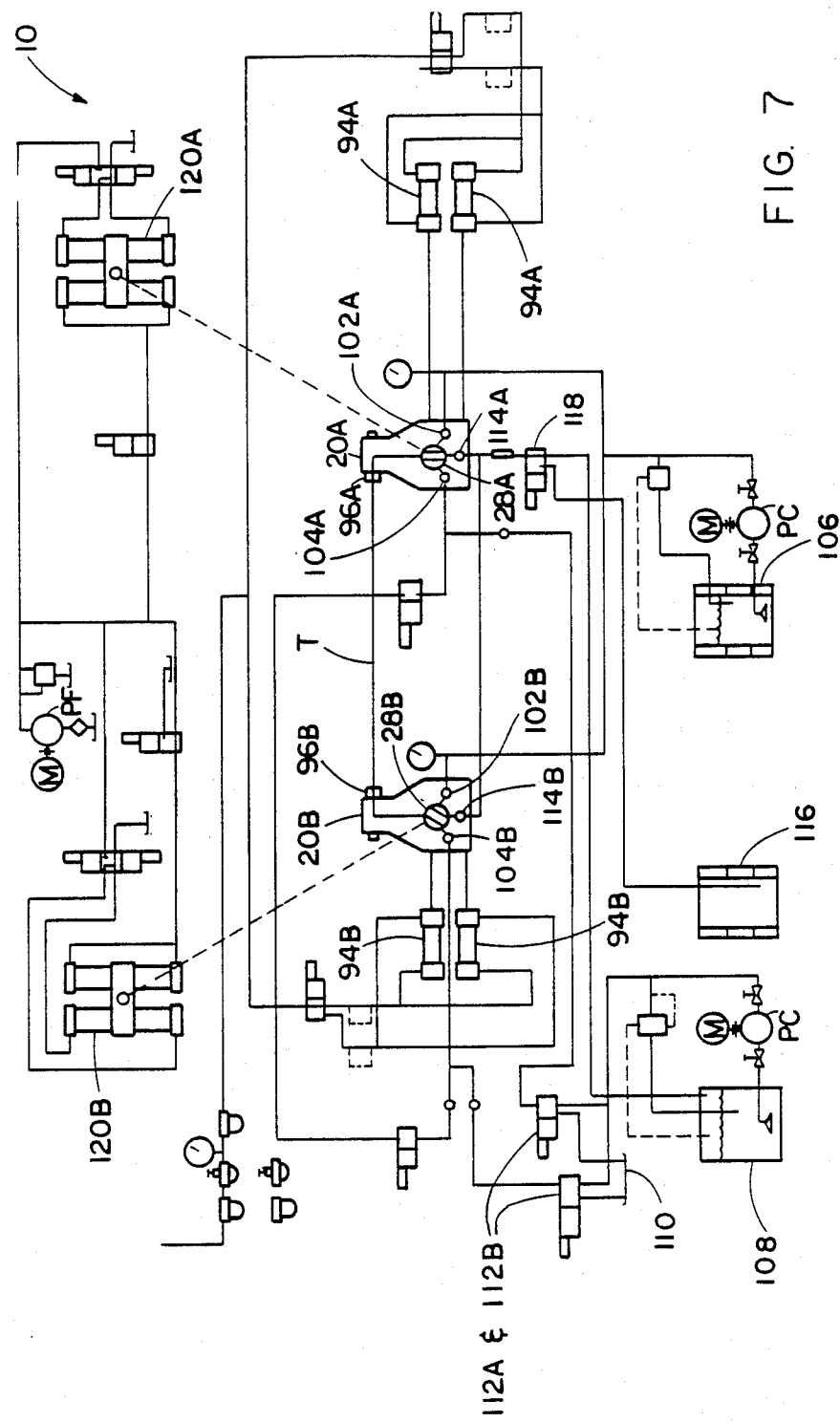
FIG. 7 is a schematic diagram of the circuit associated with the manifolds of the apparatus at the flush etching and rinsing station in FIGS. 1 and 2.
Figure 8:
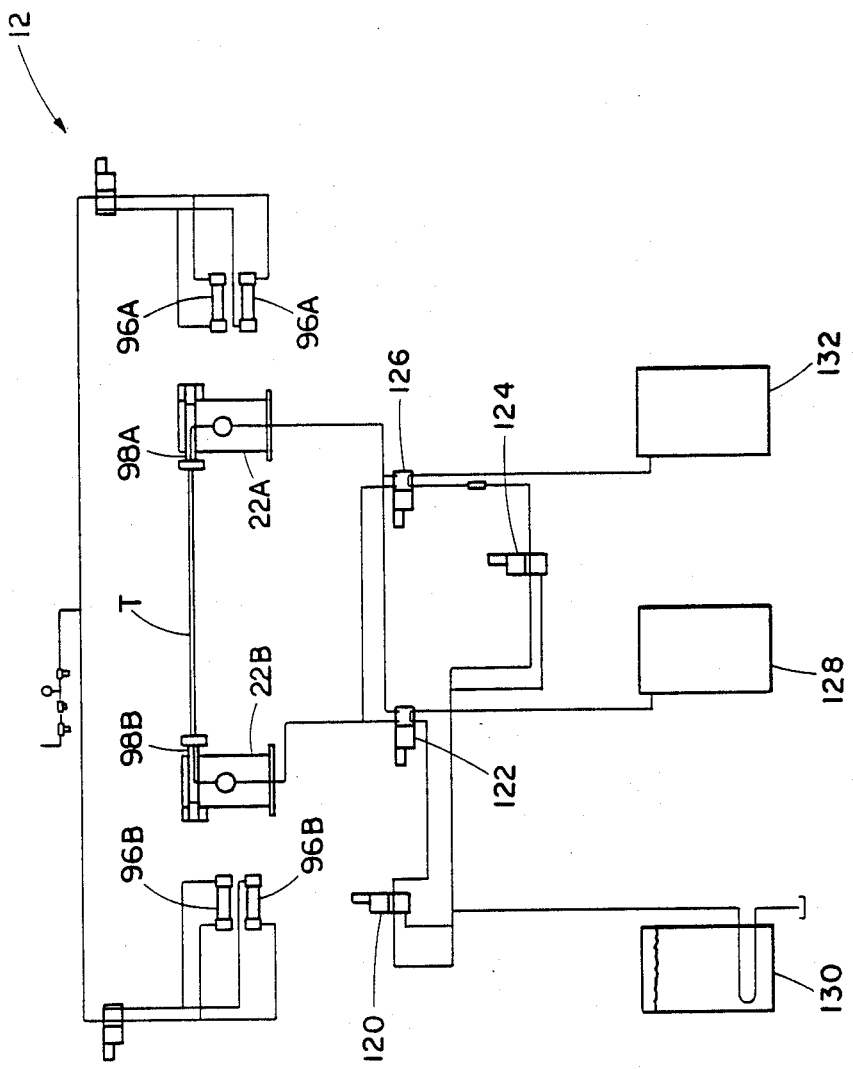
FIG. 8 is a schematic diagram of the circuit associated with the manifolds of the apparatus at the cleaning and drying station in FIGS. 1 and 2.

Referring to FIGS. 6 and 7, the manifolds 20A,20B have selector valves 28A,28B mounted therein (as do manifolds 22A,22B have selector valves 100A,100B in FIG. 8). The valves 28A,28B have acid and water ports 102A,102B and 104A,104B which lead from tanks 106,108 respectively of etching acid and rinsing water. The water ports 104A,104B also lead to the floor drain 110. Water valves 112A,112B are provided to select which one of the water tank 108 or the floor drain 110 is connected to the water ports. The valves 28A,28B also have drain ports 114A,114B which lead to a spent acid tank 116 or to the rinsing-water tank 108. Likewise, a drain valve 118 is provided to select which one of the spent acid tank 116 or the water tank 108 is connected. Rotary actuators 120A,120B are provided to operate the selector valves 28A,28B.

With the nozzles 96A,96B of the manifolds 20A,20B at the flush etching and rinsing station 10 in engaged positions over the tube ends as shown in FIG. 6, the actual etching process may begin. The selector valve arrangement in FIG. 6 makes it possible to etch and rinse the tube interior without repositioning the tube. The selector valves 28A,28B each have three channels 122A,122B,122C and 124A,124B,124C which upon rotation of the valves will align with ones of the acid, water and drain ports 102A,104A,114A and 102B,104B,114B and the nozzles 96A and 96B to allow flow of acid or water or to act as a drain.

One way in which the actual reverse flow flush etching and rinsing sequence occurs is as follows:

Step 1: Adjust selector valve 28A for acid flow. Adjust selector valve 28B for draining. Adjust drain valve 118 for draining to spent acid tank 116. Acid will flow from acid tank 106 through tube from right to left and back to spent acid tank.

Step 2: Keep selector valve 28B in drain position. Adjust selector valve 28A for water flow. Adjust drain valve 118 for draining to water tank 108. Water will flow from water tank 108 through tube from right to left, purge acid, and back to water tank.

Step 3: Adjust selector valve 28B for acid flow. Adjust selector valve 28A for draining. Adjust drain valve 118 for draining to spent acid tank 116. Acid will flow from acid tank 106 through tube from left to right and back to spent acid tank.

Step 4: Keep selector valve 28A in drain position. Adjust selector valve 28B for water flow. Adjust drain valve 118 for draining to water tank 108. Water will flow from water tank 108 through tube from left to right, purge acid, and back to water tank.

Using the above-described flow reversal procedure, the tapered inside diameter surface along the tube length due to diluted acid will be minimized, although there still will be a slight difference at the center of the tubes. Because the transition between acid flows and the water flushes occurs quickly and without exposure to the atmosphere, the problem of spotting is eliminated. Note also that since the nozzles contact and seal against each end of the tubes, there is no exposed acid, and hence, fume and splash control is much more easily attained.

In summary, it is the location of the three-way selector valves 28A,28B close to the tubes which permits quick flow reversal of the acid and then a water flush so as to provide a relatively uniform inside diameter etch while at the same time nearly eliminating the chance for tubes to spot and reducing fume and splash problems.

It will be noted in the schematic diagram of the entire etch and rinse station 10 in FIG. 7 that when the acid drains, the drain valve 118 diverts the flow to the spent acid solution tank 116 for recycling. Also, during water rinsing, the water returns to the water tank 108 for reprocessing.

After the tubes are etched and rinsed at station 10, they are transferred by the conveyor to the cleaning and drying station 12 and placed between the manifolds 22A,22B. As shown in the schematic diagram of the entire clean and dry station 12 in FIG. 8, through a simple valve arrangement after the receiving nozzles 98A,98B are in place, steam is blown through the tube interiors and then hot, dry, filtered air. The valve arrangement includes steam bleed and control valves 120,122 and hot air bleed and control valves 124,126. Steam is supplied by a steam generator 128 and condensed water returns to a water tank 130. Hot air is supplied by a hot dry air supply 132. It is believed that the diagram of FIG. 8 is self-explanatory so that a detailed discussion of the same is not necessary to a clear understanding of the tube processing apparatus and method of the present invention.

It should also be noted that the use of manifolds having nozzles actuated only upon compression allows the processing of a series of tubes simultaneously while still providing the flexibility of processing less than a full compliment of tubes.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. An apparatus for processing the interiors of elongated hollow tubes having open opposite ends, said tube processing apparatus comprising:
   (a) means for supporting a plurality of tubes in a stationary position for processing and at locations on the tubes displaced inwardly from their opposite ends;
   (b) a pair of tube end sealing means displacable between disengaged and engaged positions with respect to the open opposite ends of the tubes, said sealing means being spaced from said tube ends when in their disengaged positions and capping said tube ends to seal off the interiors of the tubes from the external atmosphere when in their engaged positions;
   (c) valve means for selectively interconnecting and establishing communication between at least one source of pressurized processing fluid, at least one drain for said fluid, and said pair of tube end sealing means at said tube ends, said valve means being operable for processing the tube interiors, without the necessity of repositioning the tubes from their stationary positions and thereby exposing their interiors to the atmosphere, by first establishing communication in one predetermined arrangement of said pair of tube end sealing means with said fluid source and fluid drain to cause parallel flows of said fluid in one direction through the tubes between the ends thereof and then establishing communication in another predetermined arrangement of said pair of tube end sealing means with said fluid source and fluid drain to cause parallel flows of said fluid in the opposite direction through the tubes between the ends thereof; and
   (d) power means for displacing said pair of tube end sealing means between their disengaged and engaged positions.

2. The processing apparatus as recited in claim 1, wherein said supporting means includes a pair of tube clamping mechanisms being operable between tube clamping and unclamping conditions.

3. The processing apparatus as recited in claim 2, further comprising a frame, said clamping mechanisms being mounted on said frame for movement toward and away from one another to place said mechanisms at different distances from one another corresponding to the different lengths of the tubes being processed.

4. The processing apparatus as recited in claim 1, wherein said tube end sealing means includes a pair of fluid supply manifolds having nozzles for engaging the respective open opposite end of tubes to seal off the interiors of the tubes from the external atmosphere when said manifolds are in said engaged position.

5. The processing apparatus as recited in claim 4, further comprising a frame, said fluid supply manifolds being mounted one said frame for movement toward and away from one another to place said manifolds in a desired spaced relation with respect to one another.

6. The processing apparatus as recited in claim 5, further comprising a drive mechanism mounted to said frame and drivingly coupled to at least one of said pair of manifolds for causing movement of the one of said manifolds relative to the other thereof to place said manifolds at different distances from one another corresponding to the different lengths of the tubes being processed.

7. The processing apparatus as recited in claim 1, wherein said power means includes a pair of pneumatic actuator mechanisms.

8. The processing apparatus as recited in claim 7, further comprising a frame, said pneumatic actuator mechanisms being mounted on said frame for movement toward and away from one another so as to place said actuator mechanisms in a desired spaced relation with respect to one another.

9. The processing apparatus as recited in claim 8, further comprising a drive mechanism mounted to said frame and drivingly coupled to at least one of said pair of pneumatic actuator mechanisms for causing movement of the one of said actuator mechanisms relative to the other thereof to place said actuator mechanisms at different distances from one another corresponding to the different lengths of the tubes being processed.

10. An apparatus for processing the interiors of elongated hollow tubes having open opposite ends, said tube processing apparatus comprising:
    (a) a frame;
    (b) a pair of tube clamping mechanisms being operable for supporting a plurality of tubes in generally horizontally-extending side-by-side stationary positions for processing and at spaced locations thereon displaced inwardly from their opposite ends, said clamping mechanisms being mounted on said frame for movement toward and away from one another to place said mechanisms at different distances from one another corresponding to the difference lengths of the tubes being processed;
    (c) a pair of fluid supply manifolds being displacable between disengaged and engaged positions with respect to the open opposite tube ends and having nozzles for engaging the respective tube ends when said manifolds are in their engaged positions to seal off the interior of the tubes from the external atmosphere, said fluid supply manifolds being mounted on said frame outwardly from said respective clamping mechanisms and movable toward and away from one another to place said manifolds at different distances from one another corresponding to the different lengths of the tubes being processed;
    (d) a selector valve mounted in each of said manifolds, said selector valves for selectively interconnecting and establishing communication between at least one source of pressurized processing fluid, at least one drain for said fluid, and said each manifold when in their engaged positions with the respective tube ends, said selector valves being operable for processing the tube interior, without the necessity of repositioning the tubes from their stationary positions and thereby exposing the tube interiors to the atmosphere, by first establishing communication in one predetermined arrangement of said tube end sealing manifolds with said fluid source and fluid drain to cause parallel flows of said fluid in one direction through the tubes between the ends thereof and then establishing communication in another predetermined arrangement of said tube end sealing manifolds with said fluid source and fluid drain to cause parallel flows of said fluid in the opposite direction through the tubes between the ends thereof;
    (e) a pair of actuator mechanisms being operable to displace said manifolds between their disengaged and engaged positions, said actuator mechanisms being mounted on said frame outwardly from said respective manifolds and movable toward and away from one another to place said actuator mechanisms at different distances from one another corresponding to the different lengths of the tubes being processed; and (f) a drive mechanism mounted to said frame and drivingly coupled to at least one of said pair of manifolds and one of said pair of actuator mechanisms for moving the ones of said manifolds and actuator mechanisms relative to the others thereof to place said manifolds and actuator mechanisms at said different distances from one another corresponding to the different lengths of tubes being processed.

11. The processing apparatus as recited in claim 10, wherein said drive mechanism includes:

a motor stationarily mounted to said frame; and a feed screw rotatably driven by said motor and drivingly coupled to the ones of said manifolds and actuator mechanisms.

12. The processing apparatus as recited in claim 10, wherein said nozzles of said manifolds are only operable when engaged with the tube ends to allow processing of the tube interiors such that processing of less than a full complement of the tubes can be carried out.

13. A method of processing the interiors of elongated hollow tubes having open opposite ends, said tube processing method comprising the steps of:

(a) supporting a plurality of tubes in stationary positions for processing;

(b) capping the respective open opposite ends of the tubes to seal off the interiors of the tubes from the external atmosphere; and (c) reverse flow flushing the interiors of the tubes for processing the tube interiors, without the necessity of repositioning the tubes from their stationary positions and thereby exposing the tube interiors to the atmosphere, by interconnecting and establishing communication between opposite ends of the tubes, at least one source of pressurized fluid, and at least one drain for the pressurized fluid by first establishing said communication in one predetermined arrangement of the opposite ends of the tubes with said fluid source and fluid drain to cause parallel flows of said fluid in one direction through the tubes between the ends thereof and then establishing said communication in another predetermined arrangement of the opposite ends of the tubes with said fluid source and fluid drain to cause parallel flow of said fluid in the opposite direction through the tubes between the ends thereof.

14. The processing method as recited in claim 13, wherein said reverse flow flushing step includes the steps of alternately reverse flow flush etching the tube interiors using an acid under pressure and reverse flow flush rinsing the tube interiors using water under pressure.

15. The processing method as recited in claim 14, wherein said reverse flow flush etching and rinsing steps are carried out by:

first, flush etching through the tube interiors in one direction with acid;

second, flush rinsing through the tube interiors in the same direction with water to purge the acid;

third, flush etching through the tube interiors in the opposite direction with the acid; and fourth, flush rinsing through the tube interiors in the same direction with water to purge the acid.

16. The processing method as recited in claim 13, further comprising the steps of cleaning and drying after said reverse flow flushing step.

17. The processing method as recited in claim 16, said cleaning and drying steps are carried out by:

first, flowing steam under pressure through the tube interiors; and second, flowing air under pressure through the tube interiors.

* * * * *